United States Patent [19]
Ito et al.

[11] Patent Number: 5,235,013
[45] Date of Patent: Aug. 10, 1993

[54] PROCESS FOR PRODUCING OXYGEN-PERMEABLE POLYMER

[76] Inventors: Tetsuo Ito, 1733-15, Oi, Kukizakimachi, Inashiki gun, Ibaraki-ken; Osamu Kurita, Tsuchiura Reiku Saido Haitsu, 13-28, Kawaguchi-2-chome, Tsuchiura-shi; Kenji Yasuda, 150-9, Kariyacho-2-chome, Ushiku-shi; Masayuki Takahashi, 15-2-404, Umezono-2-chome, Tsukuba-shi, all of Japan

[21] Appl. No.: 766,079

[22] Filed: Sep. 27, 1991

[30] Foreign Application Priority Data

Sep. 27, 1990 [JP] Japan .................................. 2-258131
Mar. 29, 1991 [JP] Japan .................................. 3-089101

[51] Int. Cl.$^5$ .................. C08F 210/14; C08F 214/18; C08F 226/10; C08F 214/18; C08F 220/06
[52] U.S. Cl. .................................. 526/245; 526/260; 526/318.4; 526/329
[58] Field of Search ......................................... 526/245

[56] References Cited

U.S. PATENT DOCUMENTS

| | | |
|---|---|---|
| 4,314,068 | 2/1982 | Novicky . |
| 4,341,889 | 7/1982 | Deichert et al. . |
| 4,686,267 | 8/1987 | Ellis et al. ............................. 526/245 |
| 4,766,189 | 8/1988 | Tsuetaki et al. ....................... 526/245 |

FOREIGN PATENT DOCUMENTS

| | | |
|---|---|---|
| 0109355 | 5/1984 | European Pat. Off. . |
| 0277771 | 8/1988 | European Pat. Off. . |
| 0288567 | 11/1988 | European Pat. Off. . |
| WO90/02144 | 3/1990 | PCT Int'l Appl. . |

*Primary Examiner*—Joseph L. Schofer
*Assistant Examiner*—Wu C. Cheng
*Attorney, Agent, or Firm*—Oblon, Spivak, McClelland, Maier & Neustadt

[57] ABSTRACT

An oxygen-permeable polymer is prepared by polymerizing (1) at least one first monomer selected from the group consisting of alkenes of 6–10 carbon atoms having one double bond and one side chain methyl group, and (2) at least one second monomer selected from the group consisting of (fluoro)siloxanylalkyl mono(meth)acrylates, (fluoro)siloxanylalkyl di(meth)acrylates, fluoroalkyl (meth)acrylates, alkyl (meth)acrylates, α-alkyl- or α-fluoroalkyl-acrylic acids, alkyl α-alkylacrylates, alkyl α-fluoroalkylacrylates, fluoroalkylacrylates, fluoroalkyl α-fluoroalkylacrylates and fluoroalkyl α-ackylacrylates, the copolymerization proportions of the first monomer and the second monomer being such that the first monomer ranges from 5–80% by weight and the second monomer ranges from 20–95% by weight. The polymer produced by the process has very high oxygen permeability, is resistant to adhesion and adsorption of staining substances present in lacrima or intraocular solution, and has excellent machinability and grindability.

12 Claims, No Drawings

PROCESS FOR PRODUCING OXYGEN-PERMEABLE POLYMER

The present invention relates to a process for producing an oxygen-permeable polymer. More particularly, the present invention relates to a process for producing an oxygen-permeable polymer which is very useful as an ophthalmologic material for contact lenses, intraocular lenses, etc.

Various plastic materials such as polymethyl methacrylate and the like have heretofore been used as an ophthalmologic material for contact lenses, intraocular lenses, etc. These conventional ophthalmologic materials have low oxygen permeability, and staining substances present in lacrima and intraocular solution are easily adhered thereto; consequently, the above materials have had a problem that, for example, a contact lens made thereof cannot be used for a long period of time.

Under such circumstances, a soft contact lens composed only of a poly(N-vinyl-2-pyrrolidone), having high water adsorbability was developed to enable it to be used for a long term. The lens, however, has low mechanical strength owing to the high water absorbability and, before application, must be boiled for sterilization; thus, the lens has been very complicated to use and very inconvenient to users.

As an ophthalmologic material overcoming the above drawbacks, there has been proposed in recent years a polymeric material obtained by copolymerizing a siloxanyl mono(meth)acrylate and a fluoro(meth)acrylate.

The above polymeric material has greatly different properties depending upon the copolymerization proportions of the siloxanyl mono(meth)acrylate and the fluoro(meth)acrylate. That is, when the copolymerization proportion of the siloxanyl mono(meth)acrylate is larger, the resulting polymeric material has high oxygen permeability, but staining substances become much adsorbed on or adhered to the polymeric material. Moreover, the polymeric material becomes too fragile and too soft. Conversely when the copolymerization proportion of the fluoro(meth)acrylate is larger, staining substances become less adsorbed on or adhered to the polymeric material, but the polymeric material has low oxygen permeability.

An object of the present invention is to provide a process for producing an oxygen-permeable polymer.

Another object of the present invention is to solve the above-mentioned problems of the prior art to provide a process for producing an oxygen-permeable polymer which can be suitably used as an ophthalmologic material for contact lenses, intraocular lenses, etc., which have high oxygen permeability, are not stained by adhesion and adsorption of staining substances present in lacrima or intraocular solution, and possess excellent processability.

Still other objects and advantages of the present invention will become apparent from the following description.

According to the present invention, there is provided a process for producing an oxygen-permeable polymer, which comprises polymerizing (1) at least one first monomer selected from the group consisting of alkenes of 6–10 carbon atoms having one double bond and one side chain methyl group, and (2) at least one second monomer selected from the group consisting of compounds represented by general formula (I):

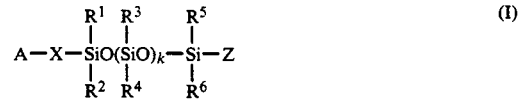

wherein A represents an unsaturated polymerizable group; X represents a bivalent hydrocarbon group of 1–10 carbon atoms; $R^1$, $R^2$, $R^3$, $R^4$, $R^5$ and $R^6$, which may be the same or different, represent fluorine-substituted or unsubstituted alkyl groups, phenyl groups, vinyl groups, hydrogen atoms, or Q groups represented by the formula:

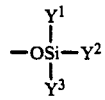

wherein $Y^1$, $Y^2$ and $Y^3$ represent fluorine-substituted or unsubstituted alkyl groups, phenyl groups, phenyl groups, vinyl groups, or hydrogen atoms, with the proviso that $R^1$ and $R^2$ are not simultaneously hydrogen atoms, $R^3$ and $R^4$ are not simultaneously hydrogen atoms, $R^5$ and $R^6$ are not simultaneously hydrogen atoms, and at least two of $Y^1$, $Y^2$ and $Y^3$ are other than hydrogen; Z represents a group represented by the formula —X—B (X is as defined above, and B represents an unsaturated polymerizable group or a hydrogen atom) or a fluoroalkyl group; k is a number of 0–100; and when plural

groups exist, these groups may be the same or different, and compounds represented by general formula (II):

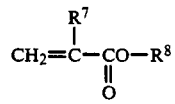

wherein $R^7$ represents a hydrogen atom, a fluorine atom or a fluorine-substituted or unsubstituted alkyl group; and $R^8$ represents a hydrogen atom, ann alkyl group of 1–20 carbon atoms, or a fluoroalkyl group of 1–20 carbon atoms bonded to CO through a bivalent hydrocarbon group of 1–4 carbon atoms, with a proviso that when $R^8$ is a hydrogen atom, $R^7$ must be a fluorine-substituted or unsubstituted alkyl group (the process is referred to hereinafter as "the first process").

According to the present invention, there is further provided a process for producing an oxygen-permeable polymer, which comprises polymerizing a monomer [referred to hereinafter as "monomer (A)"] represented by general formula (III):

wherein $R^9$ represents a bivalent hydrocarbon group of 1-4 carbon atoms, preferably 1-3 carbon atoms; $R^{10}$ represents an alkyl group of 1-20 carbon atoms, preferably 1-10 carbon atoms which may be substituted by at least one member selected from the group consisting of substituents and fluorine atom; $R^{11}$ represents an alkyl group of 1-20 carbon atoms, preferably 2-10 carbon atoms, which may be substituted by at least one member selected from the group consisting of substituents and fluorine atom, or polymerizing said monomer (A) and other alkenyl monomer (referred to hereinafter as "monomer (B)") (the process is referred to hereinafter as "the second process").

The first monomer used in the first process is an alkene of 6-10 carbon atoms having one double bond and one side chain methyl group. The first monomer includes, for example, 2-methyl-1-pentene, 2-methyl-2-pentene, 3-methyl-1-pentene, 3-methyl-2-pentene, 4-methyl-1-pentene, 4-methyl-2-pentene, 2-methyl-1-hexene, 2-methyl-2-hexene, 3-methyl-1-hexene, 3-methyl-2-hexene, 3-methyl-3-hexene, 4-methyl-1-hexene, 4-methyl-2-hexene, 5-methyl-1-hexene, 5-methyl-2-hexene, 2-methyl-1-heptene, 3-methyl-2-heptene, 5-methyl-2-heptene, 5-methyl-3-heptene, 2-methyl-1-nonene and 2-methyl-1-octene. 4-Methyl-1-pentene and 4-methyl-2-pentene are preferred. These monomers can be used alone or in combination of two or more.

The second monomer used in the first process is a compound represented by general formula (I) or general formula (II).

In general formula (I), A represents an unsaturated polymerizable group. Preferable examples of the unsaturated polymerizable group include vinyl group, (fluoro)(meth)acryloyloxy group represented by $CH_2=C(R)COO-$ (R represents a hydrogen atom, a fluorine atom, a methyl group or a fluoromethyl group), acrylamido group represented by $CH_2=CHCONH-$, styryl group represented by $CH_2=CHC_6H_4-$, cyanovinyl group represented by $CH_2=C(CN)-$ and cyanoacryloyloxy group represented by $CH_2=C(CN)COO-$.

In general formula (I), the alkyl group which $R^1$, $R^2$, $R^3$, $R^4$, $R^5$ and $R^6$ represent includes straight chain or branched chain alkyl groups of preferably 1-20 carbon atoms, more preferably 1-12 carbon atoms, such as methyl, ethyl, n-propyl, isopropyl, n-butyl, isobutyl, tert-butyl, pentyl, isopentyl, hexyl, heptyl, octyl, 2-ethylhexyl, nonyl, decyl, dodecyl, undecyl and the like. The fluorine-substituted alkyl group includes fluoroalkyl groups of preferably 1-20 carbon atoms, more preferably 3-8 carbon atoms, such as trifluoromethyl, trifluoroethyl, trifluoropropyl, pentafluorobutyl, heptafluoropentyl, nonafluorohexyl and the like.

$R^1$, $R^2$, $R^3$, $R^4$, $R^5$ and $R^6$ may also be hydrogen atoms, phenyl groups, vinyl groups or Q groups. In the Q group, $Y^1$, $Y^2$ and $Y^3$ may be the same or different and are fluorine-substituted or unsubstituted alkyl groups, phenyl groups, vinyl groups or hydrogen atoms. Examples of the fluorine-substituted or unsubstituted alkyl group are the same as mentioned with respect to $R^1$ to $R^6$ In general formula (I), X is a bivalent hydrocarbon group of 1-10 carbon atoms. Preferable examples of the bivalent hydrocarbon group of 1-10 carbon atoms are bivalent hydrocarbon groups of 1-4 carbon atoms such as methylene, ethylene, propylene and the like.

In general formula (I), Z is a group $-X-B$, wherein X is as mentioned above, i.e. a bivalent hydrocarbon group of 1-10 carbon atoms, and B is an unsaturated polymerizable group or a hydrogen atom. Examples of the unsaturated polymerizable group as B are the same as mentioned with respect to A.

k is a number of 0-100, preferably 1-20. When k is 2 or larger, the plural $R^3$'s and $R^4$'s may be the same or different.

The compounds represented by general formula (I) include, for example, (fluoro)siloxanylalkyl mono(meth)acrylates and (fluoro)siloxanylalkyl di(meth)acrylates. Specific examples of the siloxanylalkyl mono(meth)acrylates include pentamethyldisiloxanylmethyl methacrylate, pentamethyldisiloxanylmethyl acrylate, pentamethyldisiloxanylpropyl methacrylate, pentamethyldisiloxanylpropyl acrylate, methylbis(trimethylsiloxy)silylpropyl methacrylate, methylbis(trimethylsiloxy)silylpropyl acrylate, tris(trimethylsiloxy)silylpropyl methacrylate, tris(trimethylsiloxy)silylpropyl acrylate and the like. Specific examples of the fluorosiloxanylalkyl mono(meth)acrylates include 3,3,3-trifluoropropyldimethylsiloxy-bis(trimethylsiloxy)silylmethyl methacrylate, 3,3,3-trifluoropropyldimethylsiloxy-bis(trimethylsiloxy)silylmethyl acrylate, 3,3,4,4,5,5,5-heptafluoropentyldimethylsiloxyl-[bis(trimethylsiloxy)siloxy]trimethylsiloxysilylpropyl methacrylate, 3,3,4,4,5,5,5-heptafluoropentyldimethylsiloxy-[bis(trimethylsiloxy)siloxy]trimethylsiloxysilylpropyl methacrylate, 3,3,4,4,5,5,5-heptafluoropentyldimethylsiloxy(pentamethyldisiloxanyloxy)trimethylsiloxysilylpropyl methacrylate and the like. Specific examples of the siloxanylalkyl di(meth)acrylates include those represented by the following formulas:

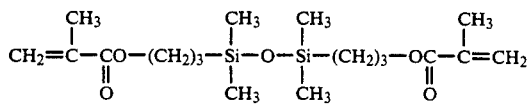

and

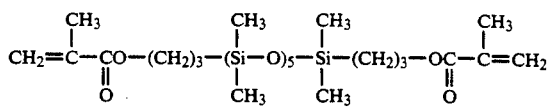

Specific examples of the fluorosiloxanylalkyl di(meth)acrylates include those represented by the following formulas:

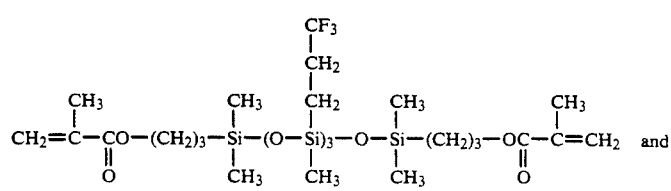 and

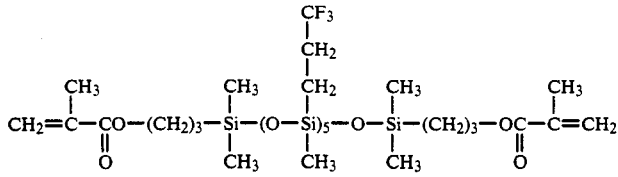

In general formula (II), $R^7$ represents a hydrogen atom, a fluorine atom or a fluorine-substituted or unsubstituted alkyl group. Examples of the fluorine-substituted or unsubstituted alkyl group are the same as mentioned with respect to $R^1$ to $R^6$.

$R^8$ represents a hydrogen atom, an alkyl group of 1–20 carbon atoms, or a straight chain or branched chain fluoroalkyl group of 1–20 carbon atoms bonded to CO through a bivalent hydrocarbon group of 1–4 carbon atoms. Specific examples of these groups will be apparent from the specific examples of the alkyl group mentioned with respect to $R^1$ to $R^6$, the specific examples of the bivalent hydrocarbon group mentioned with respect to X, and the specific examples of the fluoroalkyl group mentioned with respect to $R^1$ to $R^6$.

Incidentally, when $R^8$ is a hydrogen atom, $R^7$ must be a fluorine-substituted or unsubstituted alkyl group.

The compounds represented by general formula (II) include fluoroalkyl (meth)acrylates such as 2,2,2-trifluoroethyl methacrylate, 2,2,2-trifluoroethyl acrylate, 2,2,2-trifluoroethyl α-fluoroacrylate, 2,2,2-trifluoroethyl α-trifluoromethylacrylate, 2,2,3,3-tetrafluoropropyl methacrylate, 2,2,3,3-tetrafluoropropyl acrylate, 2,2,3,3,3-pentafluoropropyl methacrylate, 2,2,3,3,3-pentafluoropropyl acrylate, 2,2,2,2',2',2'-hexafluoroisopropyl, methacrylate, 2,2,2,2',2',2'-hexafluoroisopropyl acrylate, 2,2,3,4,4,4-hexafluorobutyl methacrylate, 2,2,3,4,4,4-hexafluorobutyl acrylate, 2,2,3,3,4,4,5,5-octafluoropentyl methacrylate, 2,2,3,3,4,4,5,5-octafluoropentyl acrylate, 2,2,3,3,4,4,5,5,6,6,7,7-dodecafluoroheptyl methacrylate, 2,2,3,3,4,4,5,5,6,6,7,7-dodecafluoroheptyl acrylate, 2,2,3,3,4,4,5,5,6,6,7,7,8,8,9,9-hexadecafluorononyl methacrylate, 2,2,3,3,4,4,5,5,6,6,7,7,8,8,9,9-hexadecafluorononyl acrylate, 3,3,4,4,5,5,6,6,7,7,8,8-tridecafluorooctyl methacrylate, 3,3,4,4,5,5,6,6,7,7,8,8-tridecafluorooctyl acrylate, 2,2,3,3-tetrafluoro-1-methylpropyl methacrylate, 2,2,3,3-tetrafluoro-1-methylpropyl acrylate, 2,2,3,3-tetrafluoro-1,1-dimethylpropyl methacrylate, 2,2,3,3-tetrafluoro-1,1-dimethylpropyl acrylate, 2,2,3,3,4,4,5,5-octafluoro-1,1-dimethylpentyl methacryalte, 2,2,3,3,4,4,5,5-octafluoro-1,1-dimethylpentyl acrylate and the like; alkyl (meth)acrylates such as methyl methacrylate, methyl acrylate, ethyl methacrylate, ethyl acrylate, isopropyl methacrylate, isopropyl acrylate, n-butyl methacrylate, n-butyl acrylate, tert-butyl methacrylate, tert-butyl acrylate, cyclohexyl methacrylate, cyclohexyl acrylate, benzyl methacrylate, benzyl acrylate, isobornyl methacrylate, isobornyl acrylate and the like; α-alkyl- or α-fluoroalkyl-acrylic acids such as α-ethylacrylic acid, α-butylacrylic acid, α-trifluoroethylacrylic acid, α-trifluoropropylacrylic acid, α-nonafluorohexylacrylic acid and the like; alkyl α-alkylacrylates such as methyl α-ethylacrylate, ethyl α-ethylacrylate, propyl α-ethylacrylate, butyl α-ethylacrylate, 2-hydroxyethyl α-ethyl-acrylate, 2-hydroxypropyl α-ethylacrylate, diethylaminoethyl α-ethylacrylate, glycidyl α-ethylacrylate, methyl α-butylacrylate, ethyl α-butylacrylate, propyl α-butylacrylate, butyl α-butylacrylate, 2-hydroxyethyl α-butyl-acrylate, 2-hydroxypropyl α-butylacrylate, diethylaminoethyl α-butylacrylate, glycidyl α-butylacrylate and the like; alkyl α-fluoroalkylacrylates such as methyl α-trifluoroethylacrylate, ethyl α-trifluoroethylacrylate, propyl α-trifluoroethylacrylate, butyl α-trifluoroethylacrylate, methyl α-trifluoropropylacrylate, ethyl α-trifluoropropylacrylate, propyl α-trifluoropropyltrifluoropropylacrylate, butyl α-trifluoropropylacrylate, methyl α-nonafluorohexylacrylate, ethyl α-nonafluorohexylacrylate, propyl α-nonafluorohexylacrylate, butyl α-nonafluorohexylacrylate and the like; fluoroalkyl α-fluoroalkylacrylates such as 2,2,2-trifluoroethyl α-trifluoroethylacrylate, 2,2,3,3-tetrafluoropropyl α-trifluoroethylacrylate, 2,2,3,3,3-pentafluoropropyl α-trifluoroethylacrylate, 2,2,2,2',2',2'-hexafluoroisopropyl α-trifluoroethylacrylate, 2,3,4,4,4-hexafluorobutyl α-trifluoroethylacrylate, 2,2,3,3,4,4,5,5-octafluoropentyl α-trifluoroethylacrylate, 2,2,3,3,4,4,5,5,6,6,7,7-dodecafluoroheptyl α-trifluoroethylacrylate 2,2,3,3,4,4,5,5,6,6,7,7,8,8,9,9-hexadecafluorononyl α-trifluoroethylacrylate, 3,3,4,4,5,5,6,6,7,7,8,8,8-tridecafluorooctyl α-trifluoroethylacrylate, 2,2,3,3-tetrafluoro-1-methylpropyl α-trifluoroethylacrylate, 2,2,3,3-tetrafluoro-1,1-dimethylpropyl α-trifluoroethylacrylate, 2,2,3,3,4,4,5,5-octafluoro-1,1-dimethylpentyl α-trifluoroethylacrylate, 2,2,2-trifluoroethyl α-nonafluorohexylacrylate, 2,2,3,3,3-pentafluoropropyl α-nonafluorohexylacrylate, 2,2,2,2',2',2'-hexafluoroisopropyl α-nonafluorohexylacrylate, 2,2,3,4,4,4-hexafluorobutyl α-nonafluorohexylacrylate, 2,2,3,3,4,4,5,5-octafluoropentyl α-nonafluorohexylacrylate, 2,2,3,3,4,4,5,5,6,6,7,7-dodecafluoroheptyl α-nonafluorohexylacrylate, 2,2,3,3,4,4,5,5,6,6,7,7,8,8,9,9-hexadecafluorononyl α-nonafluorohexylacrylate, 3,3,4,4,5,5,6,6,7,7,8,8,8-tridecafluorooctyl α-nonafluorohexylacrylate, 2,2,3,3-tetrafluoro-1-methylpropyl α-nonafluorohexylacrylate, 2,2,3,3-tetrafluoro-1,1-dimethylpropyl α-nonafluorohexylacrylate, 2,2,3,3,4,4,5,5-octafluoro-1,1-dimethylpentyl α-nonafluorohexylacrylate, 2,2,2-trifluoroethyl α-pentadecafluorononylacrylate, 2,2,3,3,3-pentafluoropropyl α-pentadecafluorononylacrylate and the like; and fluoroalkyl α-alkylacrylates such as 2,2,2-trifluoroethyl α-ethylacrylate, 2,2,3,3-tetrafluoropropyl α-ethylacrylate, 2,2,3,3,3-pentafluoropropyl α-ethylacrylate, 2,2,2,2',2',2'-hexafluoroisopropyl α-ethylacrylate, 2,2,3,4,4,4-hexafluorobutyl α-ethylacrylate, 2,2,3,3,4,4,5,5-octafluoropentyl α-ethylacrylate, 2,2,3,3,4,4,5,5,6,6,7,7-dodecafluoroheptyl α-ethylacrylate, 2,2,2-trifluoroethyl α-butylacrylate, 2,2,3,3-tetrafluoropropyl α-butylacrylate, 2,2,3,3,3-pentafluoropropyl α-butylacrylate, 2,2,2,2',2',2'-hexafluoroisopropyl α-butylacrylate, 2,2,3,4,4,4-hexafluorobutyl α-butylacrylate, 2,2,3,3,4,4,5,5-octafluoropentyl α-butylacrylate, 2,2,3,3,4,4,5,5,6,6,7,7-dodecafluorobutyl α-butylacrylate and the like.

Of the second monomers represented by general formula (I) or (II), those preferably used in the first process are siloxanylalkyl monomethacrylates such as pentamethyldisiloxanylmethyl methacrylate, pentamethyldisiloxanylpropyl methacrylate, methylbis(trimethylsiloxy)silylpropyl methacrylate, tris(trimethylsiloxy)silylpropyl methacrylate and the like; fluorosiloxanylalkyl monomethacrylates such as 3,3,3-trifluoropropyldimethylsiloxy-bis(trimethylsiloxy)silylmethyl methacrylate, 3,3,4,4,5,5,5-heptafluoropentyldimethylsiloxy[methylbis(trimethylsiloxy)siloxy]trimethylsiloxysilylpropyl methacrylate, 3,3,4,4,5,5,5-heptafluoropentyldimethylsiloxy-(pentamethyldisiloxanyloxy)trimethylsiloxysilylpropyl methacrylate and the like; fluoroalkyl methacrylates such as 2,2,2-trifluoroethyl methacrylate, 2,2,3,3-tetrafluoropropyl methacrylate, 2,2,3,3,3-pentafluoropropyl methacrylate, 2,2,2,2',2',2'-hexafluoroisopropyl methacrylate, 2,2,3,4,4,4-hexafluorobutyl methacrylate, 2,2,3,3,4,4,5,5-octafluoropentyl methacrylate, 2,2,3,3,4,4,5,5,6,6,7,7-dodecafluoroheptyl methacrylate, 3,3,4,4,5,5,6,6,7,7,8,8-tridecafluorooctyl methacrylate, 2,2,3,3-tetrafluoro-1-methylpropyl methacrylate, 2,2,3,3-tetrafluoro-1,1-dimethylpropyl methacrylate, 2,2,3,3,4,4,5,5-octafluoro-1,1-dimethylpentyl methacrylate and the like; alkyl methacrylates such as methyl methacrylate, ethyl methacrylate, isopropyl methacrylate, n-butyl methacrylate, tert-butyl methacrylate, cyclohexyl methacrylate, benzyl methacrylate, isobornyl methacrylate and the like; alkyl α-alkylacrylates such as methyl α-butylacrylate, ethyl α-butylacrylate and the like; alkyl α-fluoroalkylacrylates such as methyl α-nonafluorohexylacrylate, ethyl α-nonafluorohexylacrylate, butyl α-nonafluorohexylacrylate and the like; and siloxanylalkyl dimethacrylates represented by the following formulas:

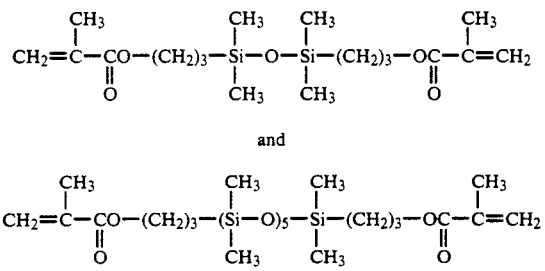

and

These second monomers are copolymerized, alone or in combination of two or more, with the first monomer.

In the first process, the copolymerization proportions of the first monomer and the second monomer are preferably such that the first monomer is 5–80% by weight and the second monomer is 20–95% by weight and more preferably such that the first monomer is 10–60% by weight and the second monomer is 40–90% by weight.

In the first process, besides the first monomer and the second monomer, other monomers may be copolymerized as long as the meritorious effects of the present invention are not impaired.

Said other monomers include polyfunctional crosslinking monomers such as ethylene glycol dimethacrylate, ethylene glycol diacrylate, diethylene glycol dimethacrylate, diethylene glycol diacrylate, triethylene glycol dimethacrylate, triethylene glycol diacrylate, tetraethylene glycol dimethacrylate, tetraethylene glycol diacrylate, propylene glycol dimethacrylate, propylene glycol diacrylate, 1,4-butanediol dimethacrylate, 1,4-butanediol diacrylate, neopentylglycol dimethacrylate, neopentylglycol diacrylate, trimethylolpropane trimethacrylate, trimethylolpropane triacrylate and the like. These polyfunctional crosslinking monomers may be used alone or in combination of two or more.

The polyfunctional crosslinking monomer is used when it is intended to obtain a polymer of higher hardness and increased processability such as machinability, grindability, etc. The copolymerization proportion of the polyfunctional crosslinking monomer is generally 30% by weight or less, preferably 20% by weight or less, more preferably 0.5–30% by weight, based on the weight of the total monomers. When the copolymerization proportion is larger than 30% by weight, the resulting polymer is brittle and has low oxygen permeability in some cases. When the copolymerization proportion is less than 0.5% by weight, the dimension stability of the polymer obtained becomes inferior.

In order to obtain a polymer having a hydrophilic surface, it is possible to copolymerize a hydrophilic monomer such as acrylic acid, methacrylic acid, N-vinyl-2-pyrrolidone, 2-hydroxyethyl methacrylate or the like. When the copolymerization proportion of the hydrophilic monomer is high, the resulting polymer may have deteriorated oxygen permeability; therefore, the copolymerization proportion is generally 20% by weight or less, preferably 5–15% by weight based on the weight of the total monomers.

The monomer used in the second process of the present invention is a monomer represented by general formula (III). In general formula (III), the bivalent hydrocarbon group of 1–4 carbon atoms which $R^9$ represents includes a methylene group, an ethylene group, a propylene group, etc.

In general formula (III), the alkyl groups of 1–20 carbon atoms which $R^{10}$ and $R^{11}$ represent include methyl group, ethyl group, n-propyl group, isopropyl group, n butyl group, isobutyl group, tert-butyl group, pentyl group, isopentyl group, hexyl group, heptyl group, octyl group, 2-ethylhexyl group, nonyl group, decyl group, dodecyl group, undecyl group, etc. The substituted alkyl groups of 1–20 carbon atoms which $R^{10}$ and $R^{11}$ represent are those having, as a substituent, a hydroxyl group, a glycidyl group, an amino group, an alkoxy group or the like; and specifically include 2-hydroxyethyl group, 2-hydroxypropyl group, 2-hydroxybutyl group, dimethylaminoethyl group, diethylaminoethyl group, glycidyl group, cyclohexyl group, isobornyl group, benzyl group, n-butoxyethyl group and 2-phenoxyethyl group. The fluorine-substituted alkyl groups of 1–20 carbon atoms which $R^{10}$ and $R^{11}$ represent include trifluoromethyl group, trifluoroethyl group, trifluoropropyl group, pentafluorobutyl group, heptafluoropentyl group, nonafluorohexyl group, etc.

In the present invention, specific examples of the monomer (A) include 2-hydroxyethyl α-ethylacrylate, 2-hydroxypropyl α-ethylacrylate, diethylaminoethyl α-ethylacrylate, glycidyl α-ethylacrylate, 2-hydroxyethyl α-butylacrylate, 2-hydroxypropyl α-butylacrylate, diethylaminoethyl α-butylacrylate, and glycidyl α-butylacrylate; and also include the examples of alkyl α-alkylacrylates, alkyl α-fluoroalkylacrylates and fluoroalkyl α-fluoroalkylacrylates specifically mentioned above with respect to the compounds represented by general formula (II).

These monomers (A) are polymerized alone or in combination of two or more.

In the second process, the monomer (A) may be polymerized with other alkenyl monomers (B).

The monomer (B) includes, for example, the above-mentioned compounds represented by general formula (I) and compounds represented by general formula (IV):

wherein $Y^1$ represents a hydrogen atom, a fluorine atom, a methyl group or a fluoromethyl group; $Y^2$ represents a fluoroalkyl group of 1-20 carbon atoms, preferably 1-10 carbon atoms.

Specific examples of the compounds represented by general formula (IV) include 2,2,2-trifluoroethyl methacrylate, 2,2,2-trifluoroethyl acrylate, 2,2,3,3-tetrafluoropropyl methacrylate, 2,2,3,3-tetrafluoropropyl acrylate, 2,2,3,3,3-pentafluoropropyl methacrylate, 2,2,3,3,3-pentafluoropropyl acrylate, 2,2,2,2',2',2'-hexafluoroisopropyl methacrylate, 2,2,2,2',2',2'-hexafluoroisopropyl acrylate, 2,2,3,4,4,4-hexafluorobutyl methacrylate, 2,2,3,4,4,4-hexafluorobutyl acrylate, 3,3,4,4,5,5,6,6,7,7,8,8,8-tridecafluorooctyl methacrylate, 3,3,4,4,5,5,6,6,7,7,8,8,8-tridecafluorooctyl acrylate, 2,2,3,3-tetrafluoro-1-methylpropyl methacrylate, 2,2,3,3-tetrafluoro-1-methylpropyl acrylate, 2,2,3,3,4,4,5,5-octafluoro-1,1-dimethylpentyl methacrylate and 2,2,3,3,4,4,5,5-octafluoro-1,1-dimethylpentyl acrylate.

These monomers (B) can be used alone or in combination of two or more, for polymerization with the monomer (A).

By polymerizing the monomer (A) with the monomer (B), there can be obtained an oxygen-permeable ophthalmologic material having increased oxygen permeability and/or mechanical strength and higher resistance to adhesion and adsorption of staining substances.

In the second process, the polymerization proportions of the monomer (A) and the monomer (B) are generally such that the monomer (A) is 5-100% by weight and the monomer (B) is 0-95% by weight, preferably such that the monomer (A) is 5-90% by weight and the monomer (B) is 10-95% by weight, more preferably such that the monomer (A) is 10-80% by weight and the monomer (B) is 20-90% by weight.

In the second process, besides the monomer (B), other monomers may be polymerized with the monomer (A) as long as the meritorious effects of the present invention are not impaired.

Said other monomers include those polyfunctional crosslinking monomers and hydrophilic monomers mentioned in the first process. The copolymerization proportion of the other monomer is the same as in the first process.

In the second process, in order to obtain a polymer of improved strength and processability, it is possible to polymerize an alkyl (meth)acrylate, an alkyl itaconate, an alkyl fumarate or the like [referred to hereinafter as "monomer (C)"] with the monomer (A) or with the monomer (A) and the monomer (B). The monomer (C) includes methyl methacrylate, methyl acrylate, ethyl methacrylate, ethyl acrylate, isopropyl methacrylate, isopropyl acrylate, butyl methacrylate, butyl acrylate, tert-butyl methacrylate, tert-butyl acrylate, cyclohexyl methacrylate, cyclohexyl acrylate, benzyl methacrylate, benzyl acrylate, isobornyl methacrylate, isobornyl acrylate, methyl itaconate, butyl itaconate, phenyl itaconate, dimethyl itaconate, dibutyl itaconate, dimethyl maleate, dimethyl fumarate, etc. The copolymerization proportion of the monomer (C) is generally 50% by weight or less, preferably 40% by weight or less, more preferably 5-40% by weight, based on the weight of the total monomers. When the proportion of the monomer (C) exceeds 40% by weight, it adversely affects the oxygen permeability of the resulting ophthalmologic material. When the proportion of the monomer (C) is less than 5% by weight, the polymer obtained is brittle in some cases.

The polymerization in the first and second processes can be carried out according to an ordinary radical polymerization reaction. It can be carried out by elevating the temperature of the polymerization system stepwise in the presence of a thermal polymerization initiator such as benzoyl peroxide, azobisisobutyronitrile or the like, or by applying ultraviolet rays to the polymerization system in the presence of a photopolymerization initiator such as benzoin, benzophenone, Michler's ketone or the like. In this case, the thermal polymerization initiator or photopolymerization initiator is used in an amount of ordinarily 0.01-5 parts by weight per 100 parts by weight of the monomer mixture.

When the polymer obtained according to the present invention is used for applications such as contact lens, intraocular lens and the like, which require compatibility with lacrima and intraocular solution, the polymer is subjected, after having been processed into a desired shape such as contact lens, intraocular lens or the like, to surface treatment to impart hydrophilicity to the surface. The surface treatment includes surface treatment with alkali, surface treatment with a plasma of oxygen, nitrogen or the like, surface treatment by plasma polymerization of a hydrophilic group-containing compound, and surface treatment by vapor deposition, sputtering or ion plating of an inorganic oxide.

The oxygen-permeable polymer produced by the present invention has very high oxygen permeability, is resistant to adhesion and adsorption of staining substances present in lacrima and intraocular solution, and has good processability such as machinability, grindability, etc. Accordingly, the oxygen-permeable polymer produced by the present invention is suitably used as an ophthalmologic material for contact lenses, intraocular lenses, etc.

The present invention is hereinafter described in detail referring to Examples and Comparative Example. However, the present invention is not restricted to these Examples.

Incidentally, the following criterion for evaluation of processability and the following test methods were used in the Examples and Comparative Example.

(1) CRITERION FOR EVALUATION OF PROCESSABILITY

Machinability

A: The machined surface is lustrous.
B: The machined surface is lustrous but slightly opaque.
C: The machined surface is rough and white.

Grindability

A: The ground surface has good luster.
B: Grinding is uneven.
C: The ground surface is rough and white.

(2) TEST METHOD FOR OXYGEN PERMEATION CONSTANT

A contact lens obtained was measured for oxygen permeation constant in a 0.9% physiological saline solution at 35° C., using an I.P.I. film oxygen permeability meter manufactured by Rika Seiki Kogyo Co., Ltd.

(3) TEST METHOD FOR VISIBLE LIGHT TRANSMITTANCE

A disc obtained was measured for transmittance at 500-600 nm, using a double-beam spectrophotometer, Model 200-20 manufactured by Hitachi, Ltd.

(4) TEST METHOD FOR STAINING RESISTANCE

A disc obtained was immersed in a staining solution for 30 days, then washed with a contact lens cleaner, All Way Cleaner manufactured by Ricky Contact Lens, Inc. to remove the stain attached to the surface, and measured for visible light transmittance. The staining resistance of the disc was expressed as a proportion of the visual light transmittance after stain removal to the visible light transmittance before immersion. Incidentally, as the staining solution, there was used a mixture consisting of 0.1 part by weight of egg albumin, 0.1 part by weight of egg white lysozyme, 0.1 part by weight of bovine gastric mucin, 0.1 part by weight of egg yolk lecithin and 100 parts by weight of purified water. The staining solution was replaced by a fresh staining solution every 2-3 days.

EXAMPLE 1

There were thoroughly mixed, at room temperature, 35 parts by weight of a siloxanylalkyl dimethacrylate represented by the following formula,

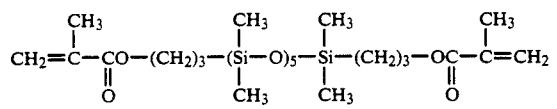

20 parts by weight of 2,2,2-trifluoroethyl methacrylate, 0 parts by weight of methyl methacrylate, 25 parts by weight of 4-methyl-1-pentene and 0.1 part by weight of benzoin methyl ether as a polymerization initiator. The mixture was poured into a polymerization vessel made of a polyethylene, and subjected to copolymerization in a nitrogen atmosphere at room temperature for 16 hours while applying ultraviolet rays.

The resulting bulk copolymer was machined and ground to form a contact lens and discs of 0.2 mm in thickness and 15 mm in diameter to evaluate the processability of the copolymer. Then, various tests were conducted for the lens and the discs. The results are shown in Table 1.

EXAMPLE 2

There were thoroughly mixed, at room temperature, 40 parts by weight of tris(trimethylsiloxy)silylpropyl methacrylate, 5 parts by weight of 2,2,2′,2′,2′-hexafluoroisopropyl methacrylate, 20 parts by weight of methyl methacrylate, 20 parts by weight of 4-methyl-1-pentene, 10 parts by weight of ethyl α-nonafluorohexylacrylate, 5 parts by weight of methacrylic acid and 0.1 part by weight of benzoin methyl ether as a polymerization initiator. The mixture was poured into a polymerization vessel made of a polyethylene, and subjected to copolymerization in a nitrogen atmosphere at room temperature for 16 hours while applying ultraviolet rays.

The resulting bulk copolymer was machined and ground to form a contact lens and discs of 0.2 mm in thickness and 15 mm in diameter to evaluate the processability of the copolymer. Then, various tests were conducted for the lens and the discs. The results are shown in Table 1.

EXAMPLE 3

There were thoroughly mixed, at room temperature, 40 parts by weight of tris(trimethylsiloxy)silylpropyl methacrylate, 25 parts by weight of methyl methacrylate, 20 parts by weight of 4-methyl-1-pentene, 10 parts by weight of methyl α-nonafluorohexylacrylate, 5 parts by weight of ethylene glycol dimethacrylate and 0.1 part by weight of benzoin methyl ether as a polymerization initiator. The mixture was poured into a polymerization vessel made of a polyethylene, and subjected to copolymerization in a nitrogen atmosphere at room temperature for 16 hours while applying ultraviolet rays.

The resulting bulk copolymer wa machined and ground to form a contact lens and discs of 0.2 mm in thickness and 15 mm in diameter to evaluate the processability of the copolymer. Then, various tests were conducted for the lens and the discs. The results are shown in Table 1.

COMPARATIVE EXAMPLE 1

There were thoroughly mixed, at room temperature, 35 parts by weight of tris(trimethylsiloxy)silylpropyl methacrylate, 45 parts by weight of 2,2,2-trifluoroethyl methacrylate, 15 parts by weight of methyl methacrylate, 5 parts by weight of ethylene glycol dimethacrylate and 0.1 part by weight of benzoin methyl ether as a polymerization initiator. The mixture was poured into a polymerization vessel made of a polyethylene, and subjected to copolymerization in a nitrogen atmosphere at room temperature for 16 hours while applying ultraviolet rays.

The resulting bulk copolymer was machined and ground to form a contact lens and discs of 0.2 mm in thickness and 15 mm in diameter to evaluate the processability of the copolymer. Then, various tests were conducted for the lens and the discs. The results are shown in Table 1.

TABLE 1

| | Example | | | Comparative Example |
|---|---|---|---|---|
| | 1 | 2 | 3 | 1 |
| Oxygen permeability ($10^{-11}$ cc · cm$^2$/cm$^3$ · sec · mm Hg) | 170 | 186 | 154 | 90 |
| Visible light transmittance (%) | 92 | 92 | 90 | 88 |
| Staining resistance (%) | 98 | 92 | 90 | 86 |
| Processability | | | | |
| Machinability | A | A | A | A |
| Grindability | A | A | A | B |

EXAMPLE 4

There were thoroughly mixed, at room temperature, 40 parts by weight of propyl α-trifluoroethylacrylate, 35 parts by weight of tris(trimethylsiloxy)silylpropyl methacrylate, 15 parts by weight of methyl methacrylate, 5 parts by weight of methacrylic acid, 5 parts by weight of ethylene glycol dimethacrylate and 0.1 part by weight of benzoin methyl ether as a polymerization initiator. The mixture was poured into a polymerization vessel made of a polyethylene, and subjected to copolymerization in a nitrogen atmosphere at room temperature for 16 hours while applying ultraviolet rays.

The resulting bulk copolymer was machined and ground to form a contact lens and discs of 0.2 mm in thickness and 15 mm in diameter to evaluate the processability of the copolymer. Then, various tests were conducted for the lens and the discs. The results are shown in Table 2.

EXAMPLE 5

There were thoroughly mixed, at room temperature, 40 parts by weight of 2,2,2-trifluoroethyl α-trifluoropropylacrylate, 30 parts by weight of tris(trimethylsiloxy)silylpropyl methacrylate, 10 parts by weight of 2,2,2-trifluoroethyl methacrylate, 10 parts by weight of methyl methacrylate, 5 parts by weight of methacrylic acid, 5 parts by weight of ethylene glycol dimethacrylate and 0.1 part by weight of benzoin methyl ether as a polymerization initiator. The mixture was poured into a polymerization vessel made of a polyethylene, and subjected to copolymerization in a nitrogen atmosphere at room temperature for 16 hours while applying ultraviolet rays.

The resulting bulk copolymer was machined and ground to form a contact lens and discs of 0.2 mm in thickness and 15 mm in diameter to evaluate the processability of the copolymer. Then, various tests were conducted for the lens and the discs. The results are shown in Table 2.

TABLE 2

|  | Example 4 | Example 5 |
|---|---|---|
| Oxygen permeability ($10^{-11}$ cc · cm$^2$/cm$^3$ · sec · mm Hg) | 148 | 174 |
| Visible light transmittance (%) | 90 | 94 |
| Staining resistance (%) | 92 | 98 |
| Processability |  |  |
| Machinability | A | A |
| Grindability | A | A |

What is claimed is:

1. A process for producing an oxygen-permeable polymer, which comprises:
   polymerizing
   (1) at least one first monomer selected from the group consisting of 2-methyl-1-pentene, 2-methyl-2-pentene, 3-methyl-1-pentene, 3-methyl-2-pentene, 4-methyl-1-pentene, 4-methyl-2-pentene, 2-methyl-1-hexene, 2-methyl-2-hexene, 3-methyl-1-hexene, 3-methyl-2-hexene, 3-methyl-3-hexene, 4-methyl-1-hexene, 4-methyl-2-hexene, 5-methyl-2-hexene, 5-methyl-2-hexene, 2-methyl-1-heptene, 3-methyl-2-heptene, 5-methyl-2-heptene, 5-methyl-3-heptene, 2-methyl-1-nonene and 2-methyl-1-octene and
   (2) at least one second monomer selected form the group consisting of (fluoro)siloxanylalkyl mono(meth)acrylates, (fluoro)siloxanylalkyl di(meth)acrylates, fluoroalkyl (meth)acrylates, alkyl (meth)acrylates, α-alkyl- or α-fluoroalkyl-acrylic acids, alkyl α-alkylacrylates, alkyl α-fluoroalkylacrylates, fluoroalkyl α-fluoroalkylacrylates and fluoroalkyl α-fluoroalkylacrylates, the copolymerization proportions of the first monomer and the second monomer being such that the first monomer ranges from 5-80% by weight and the second monomer ranges from 20-95% by weight.

2. The process according to claim 1, wherein the copolymerization proportions are such that the first monomer is 10-60% by weight and the second monomer is 40-90% by weight.

3. The process according to claim 1, wherein the first monomer and the second monomer are copolymerized together with at least one polyfunctional crosslinking monomer.

4. The process according to claim 7, wherein the proportion of the polyfunctional crosslinking monomer is 30% by weight or less based on the weight of the total monomers.

5. The process according to claim 4, wherein the proportion of the polyfunctional crosslinking monomer is 0.5-20% by weight based on the weight of the total monomers.

6. The process according to claim 1, wherein the first monomer and the second monomer are copolymerized together with at least one hydrophilic monomer.

7. The process according to claim 6, wherein the hydrophilic monomer is selected from the group consisting of acrylic acid, methacrylic acid, N-vinyl-2-pyrrolidone and 2-hydroxyethyl methacrylate.

8. The process according to claim 6, wherein the proportion of the hydrophilic monomer is in a proportion of 20% by weight or less based on the weight of the total monomers.

9. The process according to claim 6, wherein the proportion of the hydrophilic monomer is 5-20% by weight of the total monomers.

10. The process according to claim 1, wherein the polymerization is a radical polymerization reaction.

11. The process according to claim 10, wherein the radical polymerization reaction is carried out by using benzoyl peroxide or azobisisobutyronitrile as a thermal polymerization initiator and elevating the system temperature stepwise, or by using benzoin, benzophenone or Michler's ketone as a photopolymerization initiator and applying ultraviolet rays to the system.

12. The process according to claim 11, wherein the proportion of the thermal polymerization initiator or the photopolymerization initiator is 0.01-5 parts by weight per 100 parts by weight of the monomer mixture.

* * * * *